US012645258B2

(12) United States Patent
Hu et al.

(10) Patent No.: US 12,645,258 B2
(45) Date of Patent: Jun. 2, 2026

(54) TERMINAL DEVICE INCLUDING LIGHT EMITTING APPARATUSES

(71) Applicant: Lenovo (Beijing) Limited, Beijing (CN)

(72) Inventors: Yiting Hu, Morrisville, NC (US); Zhe Yang, Beijing (CN); Xi Chen, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 266 days.

(21) Appl. No.: 18/607,007

(22) Filed: Mar. 15, 2024

(65) Prior Publication Data

US 2024/0329686 A1      Oct. 3, 2024

(30) Foreign Application Priority Data

Mar. 31, 2023    (CN) .......................... 202310343180.2

(51) Int. Cl.
G06F 1/16             (2006.01)

(52) U.S. Cl.
CPC .......... G06F 1/1633 (2013.01); G06F 1/1616 (2013.01)

(58) Field of Classification Search
CPC ...... G06F 1/1633; G06F 1/1616; G06F 1/203; G06F 1/1643; G06F 1/1662; G06F 1/1698; G06F 1/1688; G06F 1/1637; G06F 1/1647; G06F 1/1667; H05K 5/04; H05K 5/10; H05K 9/0009; H05K 9/0015; H05K 9/006; H05K 9/0088
See application file for complete search history.

(56) References Cited

U.S. PATENT DOCUMENTS

| | | | | |
|---|---|---|---|---|
| 7,236,154 B1 * | 6/2007 | Kerr | ....................... | H05B 45/12 |
| | | | | 345/169 |
| 9,059,505 B1 * | 6/2015 | Asrani | ................... | H01Q 9/145 |
| 9,549,050 B2 * | 1/2017 | Choi | .................. | H04M 1/0249 |
| 10,921,858 B2 * | 2/2021 | Kim | ......................... | H01Q 1/44 |
| 2007/0166019 A1 * | 7/2007 | Kitahara | .............. | G06F 1/1688 |
| | | | | 396/51 |
| 2010/0316247 A1 * | 12/2010 | Ding | ...................... | G08B 7/066 |
| | | | | 381/397 |
| 2013/0234910 A1 * | 9/2013 | Oh | .......................... | H01Q 5/378 |
| | | | | 343/872 |
| 2013/0323579 A1 * | 12/2013 | Hwang | .............. | H01Q 15/0013 |
| | | | | 156/242 |
| 2016/0202732 A1 * | 7/2016 | Shi | ........................ | G06F 1/1656 |
| | | | | 361/679.55 |
| 2016/0327980 A1 * | 11/2016 | Farahani | .............. | G06F 1/1688 |
| 2019/0346885 A1 * | 11/2019 | Sepulveda | ........... | G06F 3/0482 |
| 2019/0361543 A1 * | 11/2019 | Zhang | .................. | G06F 1/1684 |
| 2021/0099779 A1 * | 4/2021 | Tang | ....................... | G06F 1/20 |

\* cited by examiner

*Primary Examiner* — Abhishek M Rathod
(74) *Attorney, Agent, or Firm* — ANOVA LAW GROUP, PLLC

(57)                ABSTRACT

A terminal device includes a first housing made of fragments of a first material. Distribution of the fragments of the first material in the first housing is irregular to cause the first housing to have a visual appearance different from other housings made of the same material.

9 Claims, 8 Drawing Sheets

11

TERMINAL DEVICE INCLUDING LIGHT EMITTING APPARATUSES

CROSS-REFERENCE TO RELATED APPLICATION

The present disclosure claims priority to Chinese Patent Application No. 202310343180.2, filed on Mar. 31, 2023, the entire content of which is incorporated herein by reference.

TECHNICAL FIELD

The present disclosure relates to the terminal field and, more particularly, to a terminal device.

BACKGROUND

With the development of the digital society, a terminal device becomes more and more important for a user. When the terminal device continues to be developed, in addition to the performance of the terminal device, the user also imposes requirements for the appearance and personalization of the terminal device.

SUMMARY

An aspect of the present disclosure provides a terminal device including a first housing made of fragments of a first material. A distribution of the fragments of the first material in the first housing is irregular causing the first housing to have a visual appearance different from other housings made of the same material.

DETAILED DESCRIPTION OF THE EMBODIMENTS

The technical solution of embodiments of the present disclosure is described in detail in connection with the accompanying drawings of embodiments of the present disclosure. The described embodiments are merely some embodiments of the present disclosure, not all embodiments. Based on embodiments of the present disclosure, all other embodiments obtained by those skilled in the art without creative efforts are within the scope of the present disclosure.

Embodiments of the present disclosure can be applied to an electronic device. The product form of the electronic device is not limited by the present disclosure and can include, but is not limited to, smartphones, tablets, personal computers (PCs), desktop computers, servers, televisions, TV boxes, and even power banks, watches, smart glasses, etc., which can be selected according to application requirements. In addition, embodiments of the present disclosure can also be applied to other non-electronic devices, such as some furniture, decorative items, etc.

Figure 1:
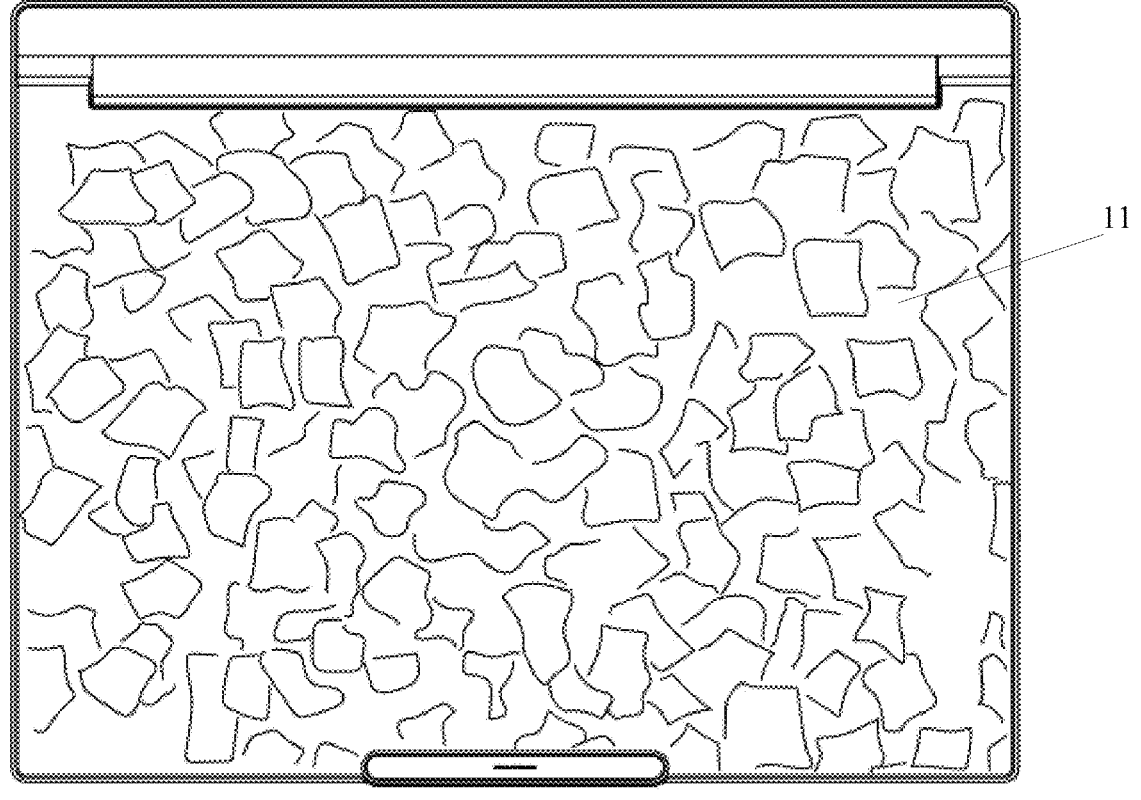
FIG. 1 illustrates a schematic diagram showing an appearance of a first housing according to some embodiments of the present disclosure.

FIG. 1 illustrates a schematic diagram showing an appearance of a first housing according to some embodiments of the present disclosure. As shown in FIG. 1, the terminal device includes a first housing 11. The first housing 11 is composed of fragments of a first material. The distribution of the fragments of the first material in the first housing 11 is irregular. Thus, the first housing 11 has a visual appearance different from other housings made of the same material.

The shapes and sizes of the fragments of the first material can be random, and the distribution positions of the fragments in the first housing 11 of the terminal device can be also random. Thus, the first housing 11 can have a unique visual appearance, which provides the user with a visual experience with rich design and personalization.

In some embodiments, the fragments of the first material can be bonded and then forged to form the first housing 11. For example, the first housing 11 can be a housing forged from carbon fiber. In the present disclosure, some obsolete structure components of other objects can be crushed and processed to obtain the fragments. Then, an adhesive material can be used to bond the fragments. After a high-temperature forging treatment, a plate for making the first housing 11 of the terminal device can be obtained. Then, the plate can be cut and fixed to form the first housing 11 of the terminal device.

The adhesive material used to bond the fragments of the first material can be resin. In some embodiments, different ratios of resin to fragments of the first material can cause different densities of fragments of the first material in the first housing 11. Therefore, the ratio of resin material and fragments of the first material can be determined based on the appearance requirements when the material of the first housing 11 is prepared.

The preparation process of the plate of the first housing is described above to facilitate those skilled in the art to better understand the technical solution of the present disclosure.

The first material described above can be aircraft seats and aircraft panels in the aviation field, railway carriage panels in the railway field, etc., or structural components from other devices, such as train carriage connection structure components, aircraft seat support components, etc. When these materials are replaced or no longer used, the obsolete materials can be reprocessed into the first housing.

Thus, the first material can be reused, which reduces the cost and consumes some obsolete objects to protect the environment.

In the terminal device of embodiments of the present disclosure, the first housing can be made of fragments of the first material, which are obtained from the obsolete structure components of other objects. Thus, the first material can be reused to be in line with the concept of recycling for environmental protection.

Since the first material applied in the aviation and railway fields has the characteristics of lightweight and high toughness, the first housing 11 made of fragments of the first material can also have the characteristics of lightweight and high strength. With the development and broad application of information and intelligence technology, people will carry one or more terminal devices when going out. With the characteristics of lightweight and high strength of the first material, the first material can be applied to the terminal devices to conform to the requirements of lightweight and collide resistance of the terminal devices.

In addition, since a current user has increasing requirements for the diversity or uniqueness of the appearance of the terminal device, a painting process can be used to cause the housing of the terminal device to have a specific pattern or visual effect in the housing design of the terminal device. Then, for different patterns and visual effects, a plurality of painting operations can be performed, which causes the preparation process of the housing of the terminal device to be complex and time-consuming. In the present disclosure, the first housing 11 can be obtained by processing the fragments of the first material. Since the sizes and shapes of the fragments of the first material are uncertain, and the distribution of the fragments in the first housing is random, the obtained first housing 11 can have a visual appearance different from other housings of the same materials. The first housing 11 can have a variety of patterns to avoid the painting process of the housing of the terminal device to shorten the time cycle of preparing the housing of the terminal device.

In the actual process of preparing the plate of the first housing, the fragments of the first material may not need to be processed into particularly small pieces. The smaller the fragments, the less obvious the visual difference between the first housing 11 and other housing made of the same material is. Therefore, to better reflect the uniqueness of the housing of the first material, the fragments of the first material can be processed to an appropriate size range based on requirements. In some embodiments, mechanical extrusion and decomposition methods can be used to process the first material. Since the fragments do not need to be processed into particularly small pieces and with a specific size and a specific shape, the process of obtaining the fragments can be relatively time-saving and labor-saving.

Moreover, in the preparation process of the plate of the first housing, after obtaining the fragments of the first material, the fragments can be dyed. Thus, the first housing made of the dyed fragments can represent a specific color. Therefore, the first housing of the terminal device can have more visual representations to satisfy different color preferences of the users.

Figure 2:
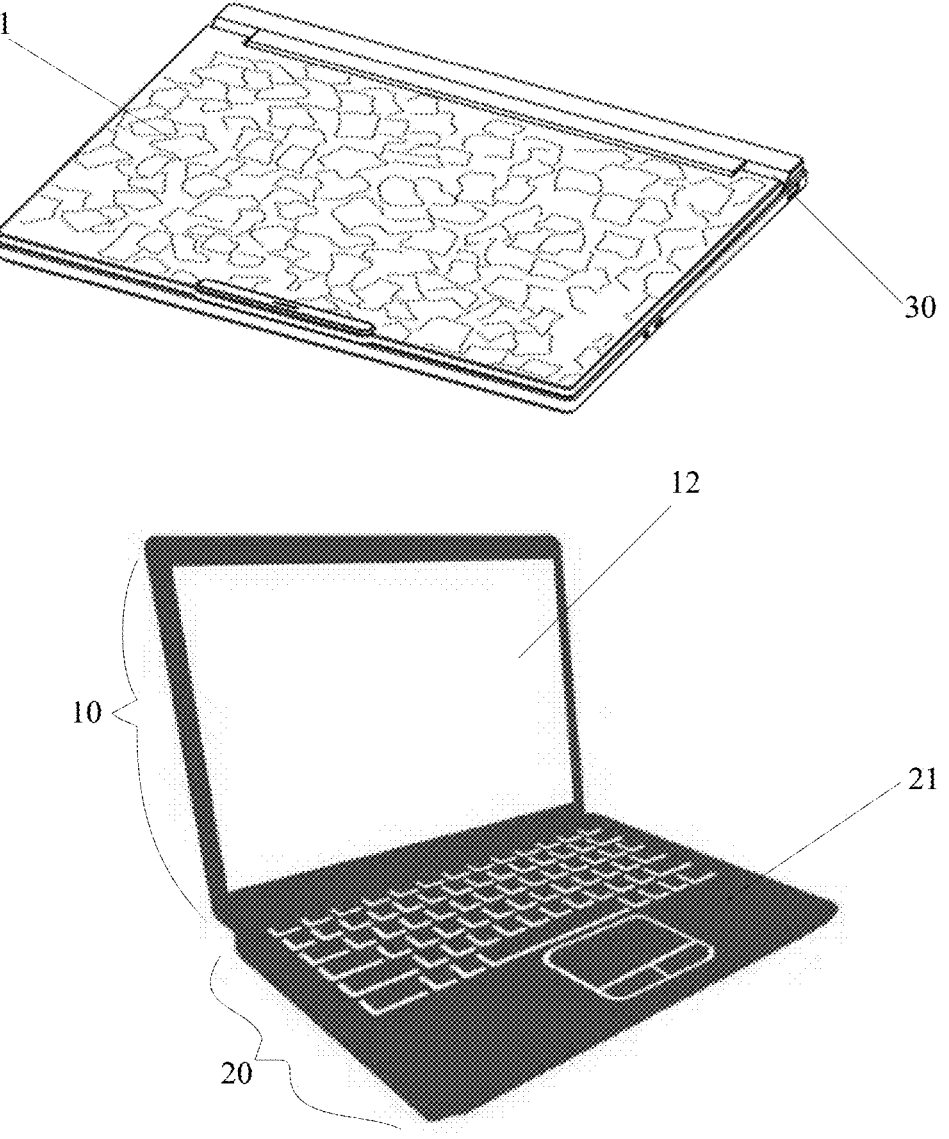
FIG. 2 illustrates a schematic diagram showing two attitudes of a terminal device according to some embodiments of the present disclosure.

FIG. 2 illustrates a schematic diagram showing two attitudes of a terminal device according to some embodiments of the present disclosure. As shown in FIG. 2, the terminal device includes a first body 10 with a first side and a second side opposite to each other, the first housing 11 arranged on the first side, a display apparatus 12 arranged on the second side, a second body 20 connected to the first body

10 through a rotatable connection apparatus 30. Thus, the terminal device can switch between a first attitude and a second attitude.

The terminal device can be a laptop computer shown in FIG. 2 or other devices with similar application forms, such as flip phones. The first housing 11 can be surface A of the laptop computer, i.e., a housing surface directly seen by the user when the laptop computer is closed. Sequentially, the surface of the first housing 10 with the display can be surface B. A surface of the second body 20 with a keyboard can be surface C. A bottom of the second body 20 can be surface D.

In the first attitude, the flip phone or the laptop computer can be in a closed attitude. In the attitude, the display apparatus 12 can face the second body 20. In the second attitude, the flip phone or the laptop computer can be in an open attitude. As shown in FIG. 2, the display apparatus 12 does not face the second body 20 in the second attitude.

The terminal device further includes a second housing 21. The second housing 21 can be different from the first housing 11 and can be made of a second material. The second material can be distributed in the second housing 21 to cause the second housing 21 to have a similar visual appearance as other housings with the same material. Since the sizes and shapes of the fragments of the first material are random, and the distribution positions of the fragments in the first housing 11 are random, the first housing 11 can have an irregular pattern appearance. The second material is distributed regularly in the second housing 21. Thus, the second housing 21 can have a regular pattern appearance.

In some embodiments, considering that the housing of surface A of the laptop computer is the appearance housing that the user is most likely to pay attention to, the laptop computer can be designed so that only the housing of surface A is made of the first material. Thus, the housing of surface A can have a unique visual appearance. Housings of other surfaces except the housing of surface A of the laptop computer can be made of the second material. Thus, housings of different surfaces can have different material textures, which provide different visual experiences inside and outside for the user.

In some embodiments, even if the housings are made of fragments of the first material, the visual appearances of different housing can be different due to the differences in the fragments (including sizes, shapes, positions, etc.). Thus, each terminal device can have a unique appearance, which satisfies the requirements of personalization and uniqueness of the user to the terminal device.

The second housing 21 can refer only to the housing on the bottom of the second body 20, such as surface D of the laptop computer. In some other embodiments, in addition to surface D of the laptop computer, the second housing 21 can also include a frame area on surface C and surface B surrounding the display. The first housing and the second housing can even exist on surface A of the laptop computer. The coverage range of the second housing 21 is not limited in the present disclosure.

The attributes of the first material and the second material can satisfy a same condition. For example, the first material and the second material can have the same composition. However, due to the different manufacturing processes, the housings made of the two materials can be different. For example, the first housing 11 can be a forged carbon fiber housing, and the second housing 21 can be a woven carbon fiber housing. In the forged carbon fiber housing, the first material can be distributed randomly, and the forged carbon fiber housing can have a unique visual appearance. The woven carbon fiber housing 21 can be woven regularly based on the second material, and the housing with the same material can have the same visual appearance.

In some other embodiments, the second material forming the second housing 21 can be different from the first material. For example, the first housing 11 can be the forged carbon fiber housing, and the second housing 21 can be made of metal, alloy, or engineering plastic of polycarbonate or ABS. The second material forming the second housing 21 is not limited in the present disclosure.

In some embodiments, the first housing 11 and the second housing 21 of the terminal device, e.g., the housings of surfaces A, B, C, and D of the laptop computer, can be configured as housings made of the first material. Thus, the visual appearance inside and outside of the laptop computer can be more consistent and harmonious. Whether the first housing 11 and the second shell 21 are configured to have the same appearance and/or material can be determined based on actual market demand.

Figure 3:
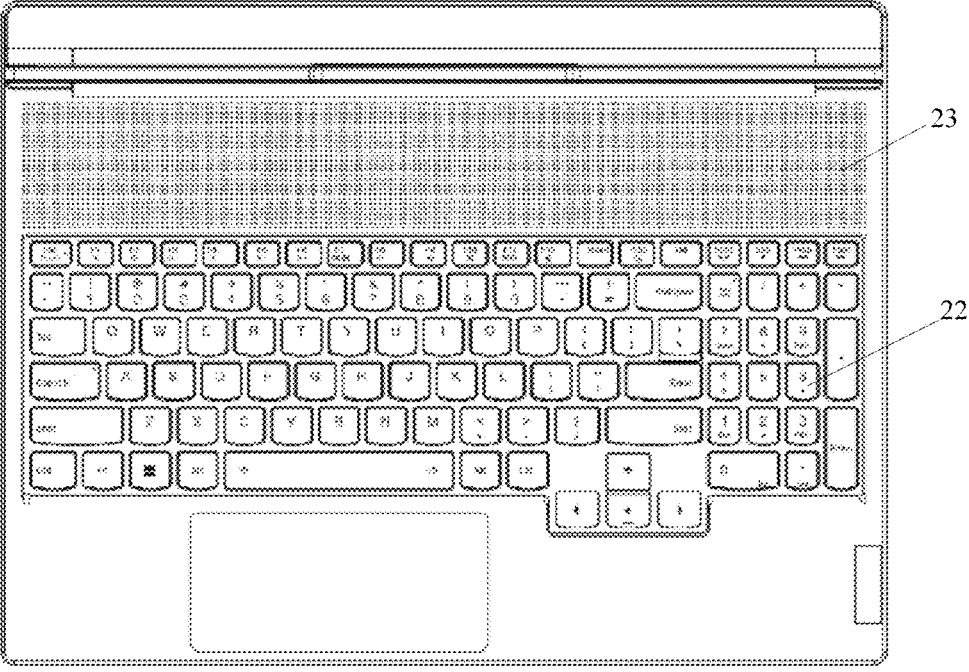
FIG. 3 illustrates a schematic diagram showing an appearance of a surface C of a laptop according to some embodiments of the present disclosure.

FIG. 3 illustrates a schematic diagram showing an appearance of a surface C of a laptop according to some embodiments of the present disclosure. As shown in FIG. 3, one side surface of the terminal device includes a first input apparatus 22 arranged on a third side of the second body 20. The third side can be a side facing the display apparatus 12 in the first attitude, the side surface of the terminal device further includes a first hole array 23 arranged on the third side and located between the input apparatus and the rotatable connection apparatus 30 and a first light-emitting apparatus arranged at the second body 20 and configured to emit light. The light can be emitted through the first hole array 23. The first light-emitting apparatus can be arranged under the first hole array 23. Thus, the first light-emitting is not shown in the side appearance in FIG. 3.

The holes in the first hole array 23 can be light-translucency. However, the holes may not be necessarily physically transparent. The holes can be designed to be physically transparent with hollow structures, or physically opaque but have a designed structure that allows light to pass through with appropriate control. Therefore, the terminal device may also include a first processing apparatus. The first processing apparatus can be configured to control a first controlled object according to a first control command to cause the light to pass through some holes. The holes through which the light can pass through can form the first content. The first controlled object can include at least one of a light-emitting assembly array configured to form the first light-emitting apparatus or the first holes in the first hole array 23. The light-emitting assembly can be configured to generate or not generate light. The first holes can be controlled to allow light to pass through or not.

In some embodiments, the holes in the first hole array 23 can be physically transparent. The first processing apparatus can be configured to control the light-emitting assembly array. The light-emitting assembly of the light-emitting assembly array can be in a one-to-one correspondence with the holes in the first hole array 23. Thus, when a light-emitting assembly emits light, the light emitted by the light-emitting assembly can pass through the hole above the light-emitting assembly. Under the control of the first processing apparatus, the light-emitting assembly array can present a specific pattern or character, or some dynamic lighting effects. The first content presented by the light-emitting assembly array can match an operating scene of the terminal device. For example, when the terminal device is in a gaming scene, the light-emitting assembly array can be controlled to display lively characters or patterns with gaming characteristics and demonstrate different patterns.

Figure 4:
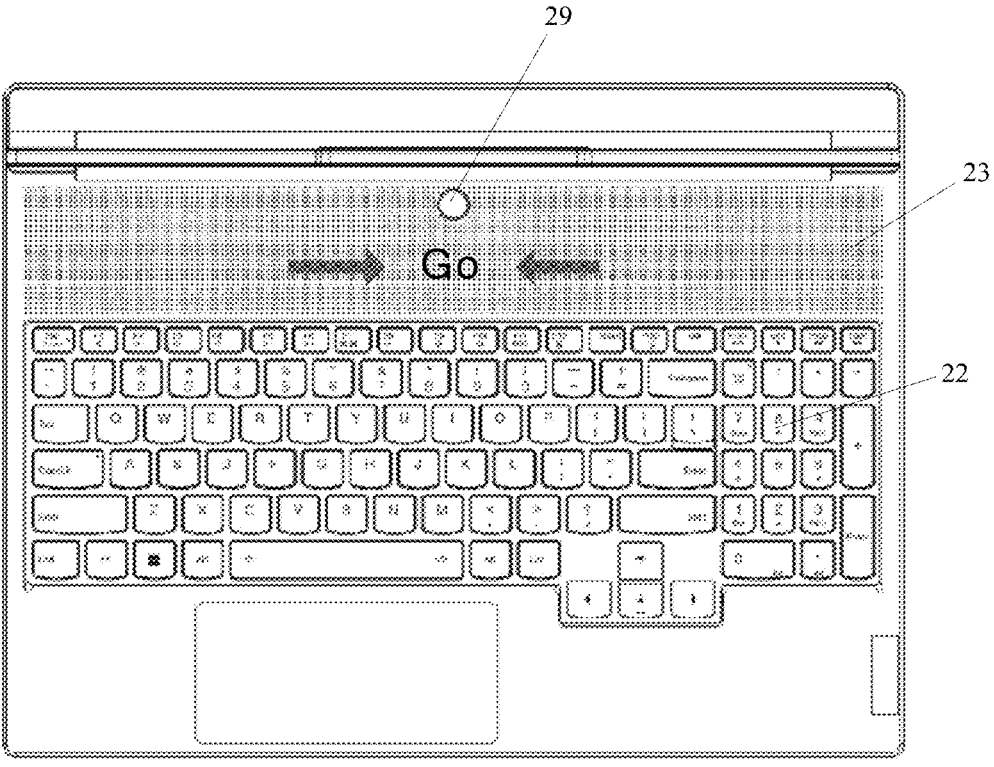
FIG. 4 illustrates a schematic diagram showing a display content of a first hole array according to some embodiments of the present disclosure.

As shown in FIG. 4, with the illumination of the light-emitting assembly array under the first hole array, "GO" character pattern indicating the end of the game countdown and the formal entry into the game is displayed.

In some other embodiments, the holes in the first hole array 23 can be physically non-transparent. For example, the first hole array 23 can be a liquid crystal module, and the transmittance of the liquid crystal module can be modified through electrical control. In some embodiments, the first light-emitting apparatus can be a whole light-emitting lamp that matches the size of the area where the first hole array 23 is located. However, through the first processing apparatus, which holes in the first hole array 23 can allow light to pass through and which holes cannot allow the light to pass through can be controlled. Then, the specific pattern or character can be represented at the first hole array 23.

In some other embodiments, the first hole array 23 can also be a controllable structure, i.e., a corresponding movable shield member in the first hole array 23. The shield member can move under the control of the first processing apparatus. When the shield member is in different positions, the shield member can cover the first hole array 23 with different areas. For the holes covered by the shield member, light cannot pass through. For the holes not covered by the shield member, the light emitted by the first light-emitting apparatus can pass through. Thus, by controlling the position of the shield member through the first processing apparatus, some specific area or pattern can be presented at the first hole array 23.

The first control command can be a command generated when the terminal device is triggered in a specific scene or mode. For example, when the terminal device is in a gaming scene, the terminal device can be triggered to generate the first control command. Thus, the first light-emitting apparatus and/or the first hole array 23 can cooperate to represent a pattern or character matching the progress of the game. In some other embodiments, when the terminal device is in a startup mode before entering the operating system, the terminal device can be triggered to generate the first control command to cause the first light-emitting apparatus and/or the first hole array 23 to cooperate to represent a dynamic prompt for waiting or loading content.

Whether the first light-emitting apparatus emits light or not under the control of the first processing apparatus is described above. In some embodiments, the color of the light emitted by the first light-emitting apparatus can be controlled by the first processing apparatus. That is, the first processing apparatus can not only control the first light-emitting apparatus to emit light or not and control the color parameter of the light emitted by the first light-emitting apparatus. Thus, the first hole array 23 can represent the first content with more colors or have an overall color tone more consistent with the display content of the display.

Figure 5:
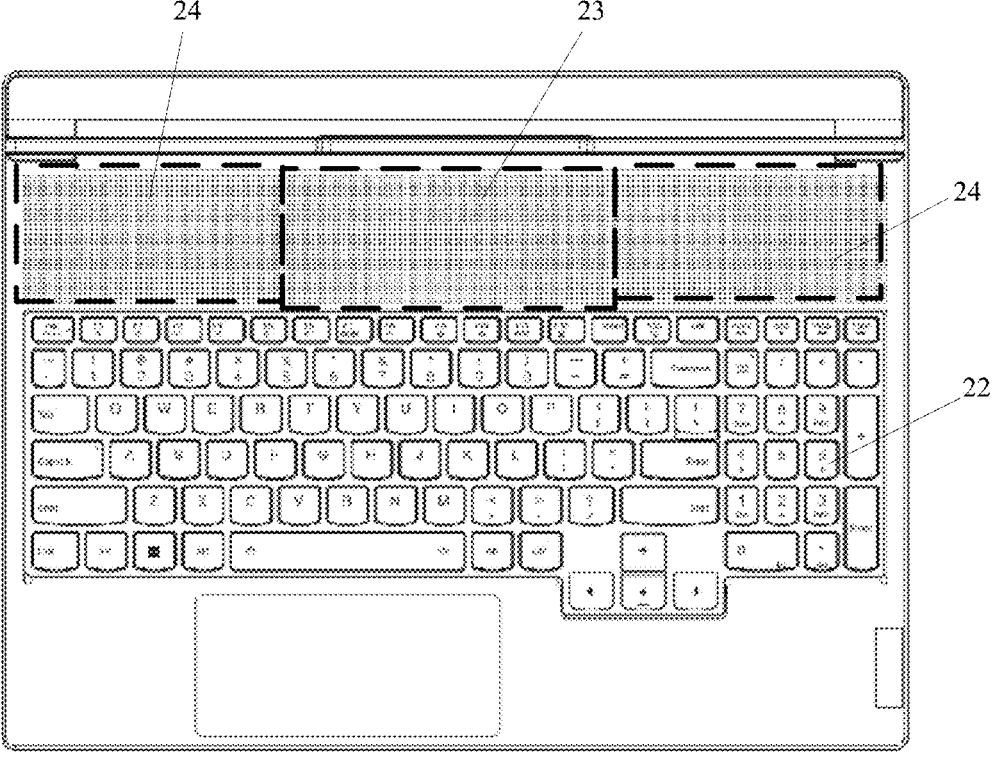
FIG. 5 illustrates a schematic diagram showing an appearance of a surface C of another laptop according to some embodiments of the present disclosure.

FIG. 5 illustrates a schematic diagram showing an appearance of a surface C of another laptop according to some embodiments of the present disclosure. As shown in FIG. 5, the third side of the terminal device, in addition to the first hole array 23, also includes a second hole array 24 arranged on the third side and located between the input apparatus and the rotatable connection apparatus 30 and a functional apparatus located inside the second body 20. An object generated by the functional apparatus can be transmitted outside of the second body 20 through the second hole array 24.

The functional apparatus can include a heating apparatus or a sound-emitting apparatus. Heat generated by the heating apparatus can pass through the second hole array 24. Sound generated by the sound-emitting apparatus can pass through the second hole array 24. The holes in the second hole array 24 can be physically hollow structures. When the functional apparatus is the heating apparatus, the heat generated by the heating apparatus can be dissipated through the physical holes to assist in the heat dissipation of the terminal device. When the functional device is the sound-emitting apparatus, the sound wave generated by the sound-emitting apparatus can be transmitted through the physical holes.

The second hole array 24 can be arranged around the first hole array 23. Thus, the first content presented by the first hole array 23 can be in a center position, which is obvious and visually coordinated. As shown in FIG. 5, the second hole array 24 is divided into a left area and a right area. The first hole array 23 is arranged between the left area and the right area. However, the position relationship of the first hole array 23 and the second hole array 24 may not be fixedly restricted. In some embodiments, the position relationship of the first hole array 23 and the second hole array 24 can be reasonably set according to the type of functional apparatus, which is not limited in the present disclosure.

The holes in the first hole array 23 and the holes in the second hole array 24 can have the same visual appearance to cause all the hole arrays to have a unified and neat appearance. The holes in the first hole array 23 and the holes in the second hole array 24 can also have different visual appearances. For example, the sizes and shapes of the holes can be different.

In some embodiments, the terminal device also includes a second input apparatus 29 (as shown in FIG. 4). The second input apparatus 29 is arranged on the third side of the second body 20. The first hole array 23 and/or the second hole array 24 are arranged around the second input apparatus 29.

The second input apparatus 29 can be the power button of the terminal device. By arranging the power button in the center position of the first hole array 23 and/or the second hole array 24, the appearance is novel and stylish. Compared to the traditional design where the power button is arranged on one side of the first input apparatus 22, the design of embodiments of the present disclosure can make the appearance of the third side of the terminal device more coordinated and aesthetically pleasing.

Figure 6:
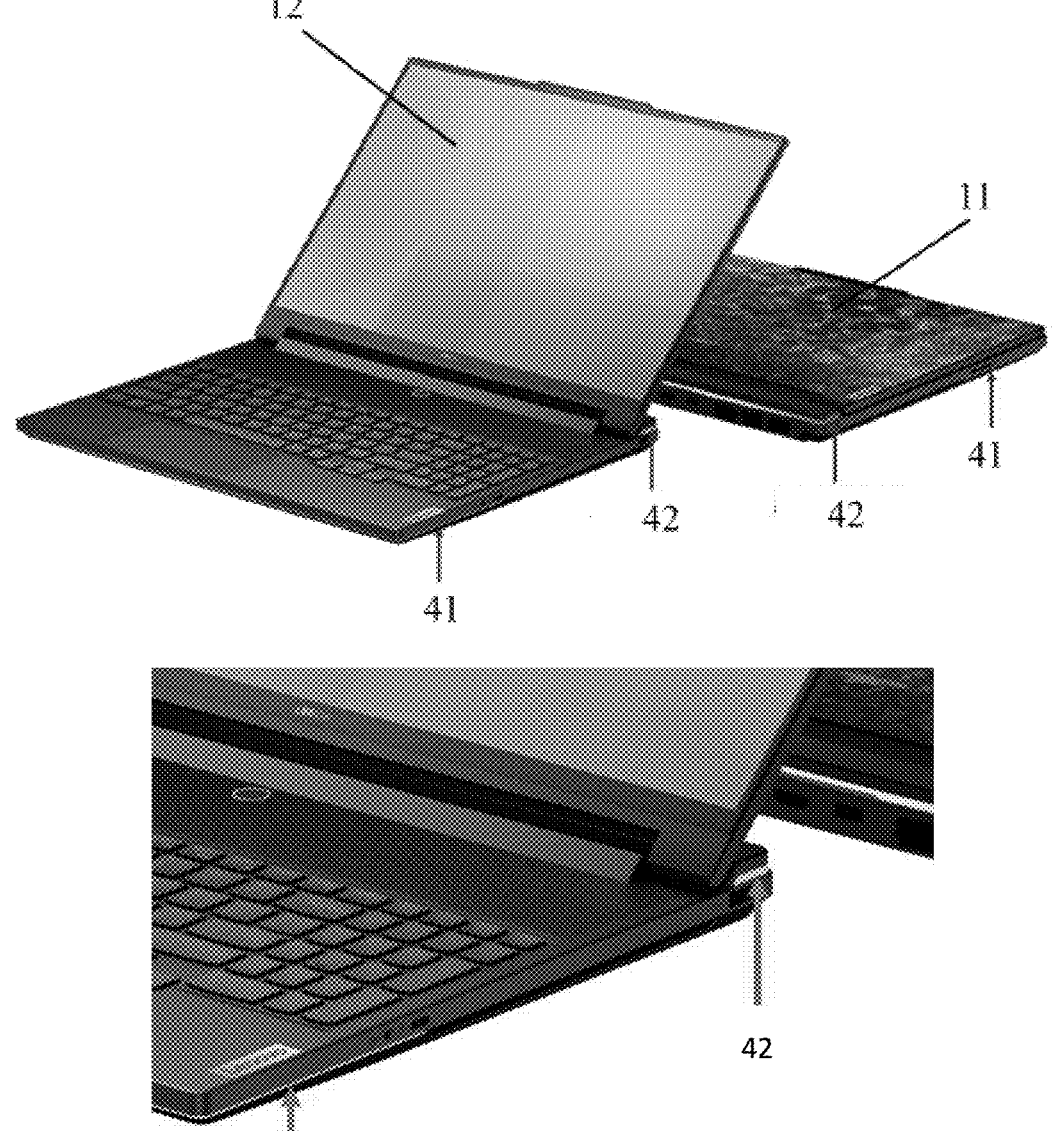
FIG. 6 illustrates a schematic diagram showing a configuration position of a lighting apparatus according to some embodiments of the present disclosure.

FIG. 6 illustrates a schematic diagram showing a configuration position of a lighting apparatus according to some embodiments of the present disclosure. As shown in FIG. 6, based on the above embodiments, the second body 20 of the terminal device includes a first end member 27 and a second end member 28 with opposite directions. The first end member 27 is away from the rotatable connection apparatus 30. The first end member 27 can be an end member of the laptop computer close to the user when the laptop computer is in the second attitude. The second end member 28 can be an end member close to the rotatable connection apparatus 30.

The terminal device also includes a second light-emitting apparatus 41 arranged at the second body 20 and located at the first end member 27 and configured to generate light. An emitting direction of the light can match the first direction. The first direction can include a direction from the third side to the fourth side. The fourth side can be a side of the second body 20 opposite to the third side. The first direction can include a vertical downward direction. Without considering a shield object, a cross-section of the area range represented by the first direction can be a fan-shaped area with an arc surface at the bottom.

Figure 7:
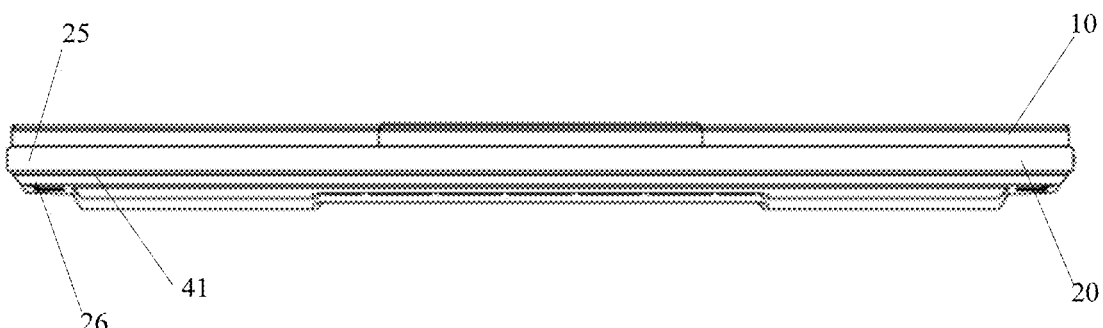
FIG. 7 illustrates a schematic diagram showing an appearance of a first end side of a terminal device according to some embodiments of the present disclosure.
Figure 8:
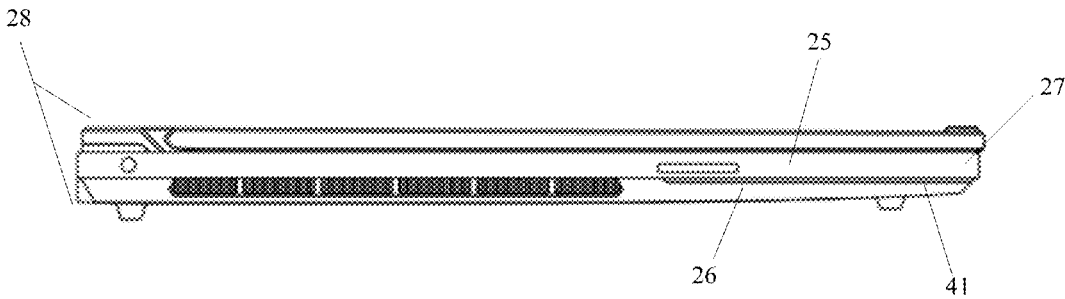
FIG. 8 illustrates a schematic diagram showing an appearance of a side of a terminal device according to some embodiments of the present disclosure.

To better understand the position of the second light-emitting apparatus 41 on the first end member 27 and the light-emitting area of the second light-emitting apparatus 41, FIG. 7 illustrates a schematic diagram showing an appearance of a first end side of a terminal device according to some embodiments of the present disclosure. FIG. 8 illustrates a schematic diagram showing an appearance of a side of a terminal device according to some embodiments of the present disclosure. In connection with FIG. 7 and FIG. 8, the first end member 27 includes a first portion housing 25 and a second portion housing 26. The third side is partially located at the first portion housing 25. The fourth side is partially located at the second portion housing 26. The size of the first portion housing 25 can be larger than the size of the second portion housing 26 in the second direction to form a drop area at the first end member 27. The second direction can be perpendicular to the first direction. The second light-emitting apparatus 41 can be arranged at the drop area. The second direction can include only the direction from the second end member 28 to the first end member 27 or can further include an extension direction of the rotation shaft of the rotatable connection apparatus 30.

The first portion housing 25 can be the housing at the upper portion of the second body 20, and the second portion housing 26 can be the housing at the lower portion of the second body 20. On the side of the first end member 27, the second portion housing 26 can be in an inset state relative to the first portion housing 25. The second light-emitting apparatus 41 can be arranged at the bottom of the first portion housing 25 and in the drop area between the first portion housing 25 and the second portion housing 26. The light emitted by the second light-emitting apparatus 41 can fill the space below and on the side where no shield object exists.

In some embodiments, the end member of the first portion housing 25 can be arranged along a third direction, and the end member of the second portion housing 26 can be arranged along a fourth direction. An angle can be between the third direction and the fourth direction. As shown in FIG. 8, the end surface of the first portion housing 25 can be arranged vertically, and the end surface of the second portion housing 26 can be inclined. Thus, the drop area between the first portion housing 25 and the second portion housing 26 can be wider at the bottom.

In some embodiments, the second light-emitting apparatus 41 can be arranged along a fifth direction at the first end member 27. The fifth direction can be parallel to the configuration direction of the rotatable connection apparatus. The length of the second light-emitting apparatus 41 can be the same as the length of the first end member 24. The configuration of the second light-emitting apparatus 41 in the fifth direction can represent the length of the second light-emitting apparatus 41. In some embodiments, the length of the second light-emitting apparatus 41 can be the same as the length of the first end member 27.

Figure 9:
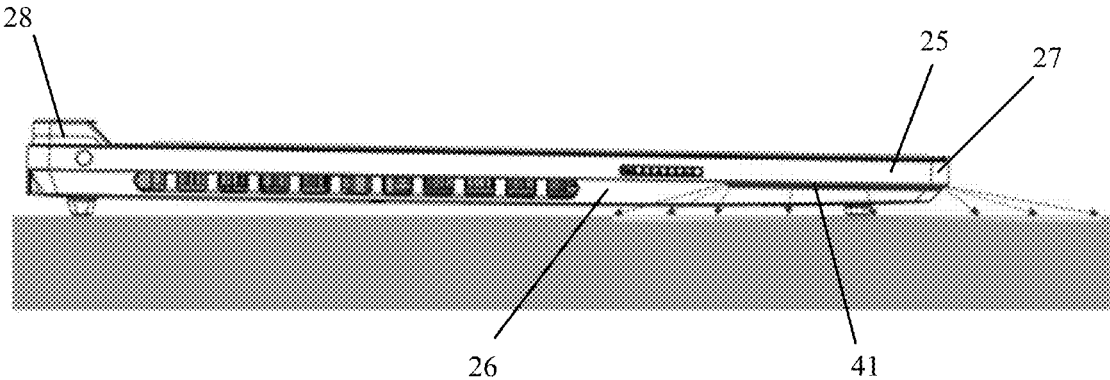
FIG. 9 illustrates a schematic diagram showing lighting of a second lighting apparatus according to some embodiments of the present disclosure.

Furthermore, the second light-emitting apparatus 41 at the first end member 27 can also be arranged along a sixth direction and a seventh direction. The sixth direction and the seventh direction can be directions from the first end member 27 to the second end member 28. That is, two sides of the second light-emitting apparatus 41 at the first end member 27 can continue to extend along the direction to the second end member 28 to form a U-shaped semi-enclosed state for the first end member 27 as a whole. As shown in FIG. 8, the second light-emitting apparatus 41 extends a distance from the first end member 27 towards the second end member 28. Thus, when the second light-emitting apparatus 41 emits light, the light emitted downward is reflected by the surface of the support object to create a luminous atmosphere that surrounds the first end member 27. FIG. 9 illustrates a schematic diagram showing a lighting direction of the second lighting apparatus 41 according to some embodiments of the present disclosure. The above content can be understood in connection with FIG. 9.

In some other embodiments, the second body 20 can include the first member 27 and the second end member 28 with opposite directions. The third side of the second body 20 can include a drop surface that reflects a height difference between the first end member 27 and the second end member 28. In the first attitude, the first body 10 can be arranged between the first end member 27 and the drop surface. The terminal device can further include a third light-emitting apparatus 42 arranged at the second body 20 and configured to emit light at the first target area of the second end member 28. The first target area may not face the drop area.

As shown in FIG. 8, a height difference exists between the first end member 27 and the second end member 28. Thus, a step is represented on the side of the second body. In the first attitude, when the terminal device is in the closed state, the thickness of the first body 10 and the second body 20 when the first body 10 is attached to the second body 20 is close to the height of the second end member 28, which can be understood in conjunction with the form of the laptop computer in the closed state shown in FIG. 6.

Figure 10:
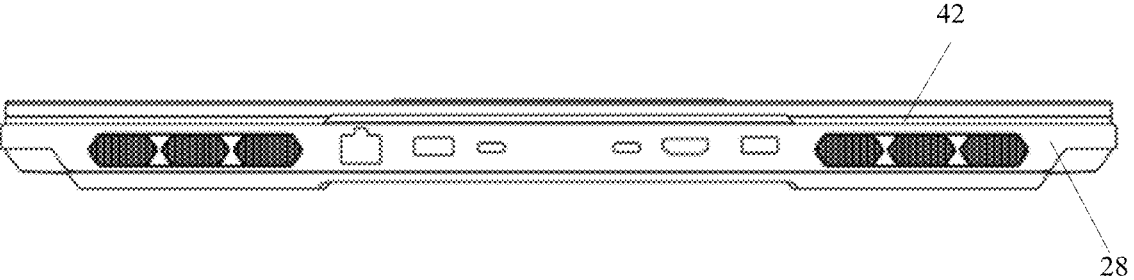
FIG. 10 illustrates a schematic diagram showing an appearance of a first end side of a terminal device according to some embodiments of the present disclosure.

FIG. 10 illustrates a schematic diagram showing an appreance of a first end side of a terminal device according to some embodiments of the present disclosure. In connection with FIG. 8 and FIG. 10, the third light-emitting apparatus 42 is arranged along an eighth direction at the second end member 28. The eighth direction is parallel to the configuration direction of the rotatable connection apparatus. The length of the third light-emitting apparatus 42 is the same as the length of the second end member 28. The configuration of the third light-emitting apparatus 42 along the eighth direction can represent the length of the third light-emitting apparatus 42. In some embodiments, the length of the third light-emitting apparatus 42 can be the same as the length of the first end member 27.

Furthermore, the third light-emitting apparatus 42 on the second end member 28 can also be arranged along a ninth direction and a tenth direction. The ninth direction and the tenth direction can be directions from the second end member 28 to the first end member 27. That is, two ends of the third light-emitting apparatus 42 at the second end 28 can extend towards the first end member 27 to form a U-shaped semi-enclosed state for the second end member 28 as a whole. As shown in FIG. 6, the second light-emitting apparatus 41 extends a distance from the second end member 28 towards the first end member 27. Thus, when the third light-emitting apparatus 42 emits light, the light emitted to the back of the terminal device can create a luminous atmosphere surrounding the second end member 28.

In some other embodiments, the terminal device can also include a second processing apparatus configured to control the second light-emitting apparatus 41 and/or the third light-emitting apparatus 42 according to the second control command. The second processing apparatus can be configured to control the second light-emitting apparatus 41 and/or the third light-emitting apparatus 42 to emit light or not, the form of light emission, and light color for the second light-emitting apparatus 41 and/or the third light-emitting apparatus 42. The form of light emission can include, for example, a constant light emission or a flashing emission. The light color can include, for example, a single color or a periodically changing color.

The second control command can be a command generated by the terminal device in a specific scene or mode. For example, when the terminal device is in standby mode, the terminal device can be triggered to generate the second control command to cause the second light-emitting apparatus 41 and/or the third light-emitting apparatus 42 to emit light with periodically and gradually changing color. For another example, when the display represents a highly recognizable image, such as an ocean scene, the terminal device can be triggered to generate the second control command to control the second light-emitting apparatus 41 and/or the third light-emitting apparatus 42 to emit blue light. When the display represents an image of fields or forests, the second light-emitting apparatus 41 and/or the third light-emitting apparatus 42 can be controlled to emit green light. Thus, the terminal device can provide the user with a luminous atmosphere that matches the specific scenes to enhance the user experience.

The user can also control to turn on or off the lighting function as needed. Only when the lighting function is turned on, the second processing apparatus can control the second light-emitting apparatus 41 and/or the third light-emitting apparatus 42 to emit light based on the second control command. In some embodiments, the terminal device can also detect the brightness of ambient light in real-time. If the ambient light around the terminal device is relatively bright, the lighting function can be turned off by default. However, if the brightness of the ambient light around the terminal device is lower than a predetermined threshold, the lighting function of the second light-emitting apparatus 41 and/or the third light-emitting apparatus 42 can be automatically turned on. The above contents are only some examples of implementing the light-emitting apparatus and do not fixedly limit the implementation of the light-emitting apparatus.

Embodiments of the present disclosure are described in a progressive manner, with each embodiment focusing on the differences from other embodiments. The same or similar parts between the various embodiments can be cross-referenced. For the apparatuses disclosed in embodiments of the present disclosure, since the apparatuses correspond to the methods of embodiments of the present disclosure, the description is relatively simple, and relevant aspects can be referred to in the description in the method section.

In the present disclosure, terms such as "first" and "second" are used merely to distinguish one entity or operation from another, without necessarily implying any actual relationship or order between these entities or operations. Furthermore, terms such as "comprising," "including," or any other variants thereof are intended to encompass non-exclusive inclusion, such that processes, methods, articles, or devices comprising a series of elements include not only those elements explicitly listed but also other elements not listed, or elements inherent to such processes, methods, articles, or devices. When there are no more limitations, an element defined by the sentence "comprising a . . . " does not exclude the presence of other identical elements in the processes, methods, articles, or devices comprising the elements.

The steps of methods or algorithms of embodiments of the present disclosure can be directly implemented by hardware, software modules executed by processors, or a combination thereof. The software modules can be placed in random access memory (RAM), memory, read-only memory (ROM), electrically programmable ROM, electrically erasable programmable ROM, registers, hard disks, removable disks, CD-ROMs, or any other form of storage medium known in the art.

The description of embodiments of the present disclosure enables those skilled in the art to implement or use the present disclosure. Various modifications to these embodiments are apparent to those skilled in the art. The general principles defined in the present disclosure can be implemented in other embodiments without departing from the spirit or scope of the present disclosure. Therefore, the present disclosure is not limited to embodiments shown in the present disclosure but encompasses the widest scope consistent with the principles and novel features of the present disclosure.

What is claimed is:

1. A terminal device, comprising:

a first housing;

a first body including a first side and a second side opposite to each other, the first housing being arranged at the first side;

a display apparatus arranged at the second side; and a second body connected to the first body through a rotatable connection apparatus to cause the terminal device to switch between a first attitude and a second attitude;

wherein:

in the first attitude, the display apparatus faces the second body; and in the second attitude, the display apparatus does not face the second body;

a first input apparatus arranged on a third side of the second body, the third side being a side facing the display apparatus in the first attitude;

a first hole array arranged on the third side and located between the first input apparatus and the rotatable connection apparatus;

a first light-emitting apparatus arranged at the second body and configured to generate light, the light passing through the first hole array;

wherein the second body includes a first end and a second end opposite to each other, the first end being away from the rotatable connection apparatus; and a second light-emitting apparatus arranged at the second body and at the first end and configured to generate light, an emission direction of the light matching a first direction, the first direction including a direction from the third side to a fourth side, and the fourth side being a side of the second body opposite to the third side.

2. The terminal device according to claim 1, further comprising:

a second housing different from the first housing and made of a second material;

wherein the second material is distributed regularly in the second housing to cause the second housing to have a visual appearance similar to other housings made of the same material.

3. The terminal device according to claim 1, further comprising:

a first processing apparatus configured to control a first controlled object according to a first control command to cause some holes of the first hole array to allow the light to pass through, a distribution of the holes allowing the light to pass through forming a first content;

wherein the first controlled object includes at least one of:

a light-emitting assembly array configured to form the first light-emitting apparatus, a light-emitting assembly being controlled to generate light or not; or the first hole array, a first hole of the first hole array being controlled to allow the light to pass through or not.

4. The terminal device according to claim 1, comprising:

a second hole array arranged on the third side and located between the input apparatus and the rotatable connection apparatus; and a functional apparatus located at the second body, an object generated by the functional apparatus being transmitted outside of the first body through the second hole array.

5. The terminal device according to claim 1, wherein the first end includes:

a first portion housing, a portion of the third side being located at the first portion housing;

a second portion housing, a portion of the fourth side being located at the second portion housing;

wherein:

a size of the first portion housing is greater than a size of the second portion housing in the second direction to form a drop area at the first end member;

the second direction is perpendicular to the first direction; and the second light-emitting apparatus is arranged in the drop area.

6. The terminal device according to claim 1, wherein:

the second body includes a first end and a second end opposite to each other;

the third side of the second body includes a drop surface representing a height difference between the first end and the second end; and in the first attitude, the first body is located between the first end and the drop surface;

the terminal device further comprising:

a third light-emitting apparatus arranged at the second body and configured to emit light in a first target area of the second end, the first target area not facing the drop area.

7. The terminal device according to claim 1, wherein the first housing made of fragments of a first material;

wherein distribution of the fragments of the first material in the first housing is irregular to cause the first housing to have a visual appearance different from other housings made of the same material.

8. The terminal device according to claim 7, wherein the first housing is formed by bonding and forging the fragments of the first material; and the first material is from structure components of other devices.

9. A terminal device, comprising:

a first housing;

a first body including a first side and a second side opposite to each other, the first housing being arranged at the first side;

a display apparatus arranged at the second side; and a second body connected to the first body through a rotatable connection apparatus to cause the terminal device to switch between a first attitude and a second attitude;

wherein:

in the first attitude, the display apparatus faces the second body; and in the second attitude, the display apparatus does not face the second body;

a first input apparatus arranged on a third side of the second body, the third side being a side facing the display apparatus in the first attitude;

a first hole array arranged on the third side and located between the first input apparatus and the rotatable connection apparatus;

a first light-emitting apparatus arranged at the second body and configured to generate light, the light passing through the first hole array;

wherein:

the second body includes a first end and a second end opposite to each other;

the third side of the second body includes a drop surface representing a height difference between the first end and the second end; and in the first attitude, the first body is located between the first end and the drop surface; and a third light-emitting apparatus arranged at the second body and configured to emit light in a first target area of the second end, the first target area not facing the drop area.

* * * * *